United States Patent [19]

Piazzola

[11] Patent Number: 4,758,146

[45] Date of Patent: Jul. 19, 1988

[54] TEMPERATURE ADJUSTING DEVICE FOR PLASTICS MATERIAL EXTRUDING, INJECTING AND DRAWING MACHINES AND CYLINDERS OF PLASTICS MATERIAL PROCESSING MACHINES IN GENERAL

[76] Inventor: Gaetano Piazzola, Via Borri, 148, 21100 Varese, Italy

[21] Appl. No.: 45,363

[22] Filed: May 1, 1987

[30] Foreign Application Priority Data

May 2, 1986 [IT] Italy .............................. 20286 A/86

[51] Int. Cl.⁴ ...................... B29C 45/74; B29C 47/82
[52] U.S. Cl. .................................... 425/144; 219/201; 219/544; 264/40.6; 425/73; 425/550; 425/DIG. 13; 425/378.1
[58] Field of Search ................. 425/73, 143, 185, 188, 425/378 R, 550, 144, DIG. 13; 264/40.6; 261/112.2, 156, 142; 219/201, 388, 523, 544; 165/166

[56] References Cited

U.S. PATENT DOCUMENTS

| | | | |
|---|---|---|---|
| 2,721,729 | 10/1955 | Van Riper | 425/550 X |
| 2,916,769 | 12/1959 | Baigent | 425/550 X |
| 3,190,997 | 6/1965 | Rothacker | 425/378 R X |
| 3,219,786 | 11/1965 | Wenzel | 425/378 R x |
| 3,743,252 | 7/1973 | Schott, Jr. | 425/378 R X |
| 4,072,185 | 2/1978 | Nelson | 425/143 X |
| 4,099,928 | 7/1978 | Norback | 261/112.2 X |
| 4,492,556 | 1/1985 | Crandell | 425/143 X |
| 4,548,341 | 10/1985 | Hambleton | 425/143 X |

FOREIGN PATENT DOCUMENTS 211428 12/1983 Japan .............................. 425/378 R Primary Examiner—Richard L. Chiesa
Attorney, Agent, or Firm—Bucknam and Archer

[57] ABSTRACT

The present invention relates to a temperature adjusting device, particularly designed for processing cylinders of extruding, injecting, drawing and the like machines for processing plastics materials in general, which comprises a flexible body, of sleeve shape, which may be arranged on the outside of the plastics material processing machine: the body is housed in an outer duct, for conveying and discharging air in a substantially transversal direction with respect to the body itself.

1 Claim, 5 Drawing Sheets

TEMPERATURE ADJUSTING DEVICE FOR PLASTICS MATERIAL EXTRUDING, INJECTING AND DRAWING MACHINES AND CYLINDERS OF PLASTICS MATERIAL PROCESSING MACHINES IN GENERAL

BACKGROUND OF THE INVENTION

The present invention relates to a temperature adjusting device, particularly designed for extruding, injecting and drawing machine cylinders, for processing plastics material in general.

As is known, for processing plastics materials and elastomeric materials in general, there are used machines which are provided with a plasticizing cylinder including heating systems which are controlled by automatic temperature adjusting means, provided for holding at a set value the temperature, in order to process in the most suitable way the plastics materials.

In these machines, as the temperature rises above the set thermal levels, it is necessary to stop the operation of the machine, with a consequent yield reduction and increase of the production cost.

The presently used devices for stabilizing the operation temperatures in these machines are not generally able of solving the above mentioned problem since they are rather complex and of difficult assembling.

Moreover, the known devices are not able of providing a constant operation and require frequently maintenance operations.

SUMMARY OF THE INVENTION

Thus, the main object of the present invention is to overcome the above mentioned drawbacks, by providing a temperature adjusting device, specifically designed for plastics material extruding cylinders, injection machines, drawing machines and plastics material processing machines in general, which affords the possibility of holding the operation temperature constant, under all of the operation conditions.

Another object of the present invention is to provide such a temperature adjusting device which may be quickly and simply installed on any types of plastics material processing cylinders, while affording the possibility of quickly controlling the machine with reduced maintenance requirements.

Yet another object of the present invention is to provide a temperature adjusting device of very simplified structure, which is very reliable and safe in operation.

Yet another object of the present invention is to provide such a temperature adjusting device, particularly designed for cylinders of plastics material extruding machines, injecting machines, drawing machines and machines for processing plastics material in general, which may be easily made starting from easily commercially available elements and materials and which, moreover, is competitive from a mere economic standpoint.

According to one aspect of the present invention, the above mentioned objects, as well as yet other objects, which will become more apparent hereinafter, are achieved by a temperature adjusting device, particularly designed for plastics material extruding, injecting and drawing machines, characterized in that it comprises a flexible body, including heating electric resistances, and adapted to be mounted as a sleeve on the outside of the machine cylinder, said body being housed in an outer envelope for conveying and discharging air, along a substantially transversal direction of said body.

BRIEF DESCRIPTION OF THE DRAWINGS

Further characteristics and advantages of the invention will become more apparent thereinafter from the following detailed description of a preferred though not exclusive embodiment of a temperature adjusting device, particularly designed for plastics material processing cylinders, which is illustrated by way of an indicative but not limitative example in the accompanying drawings, where.

DESCRIPTION OF THE PREFERRED EMBODIMENTS

With reference to the drawings, the temperature adjusting device, particularly designed for cylinders of plastics material processing machines in general, such as extruding, injecting and drawing machines, according to the invention, comprises a flexible body which substantially consists of heating assemblies 1 and heat exchanger assemblies 2, which, advantageously, are mutually intercalated and coupled along an axial direction.

Moreover, an unfinned heating assembly 3 arranged at one end is provided.

The assemblies 1, 2 and 3 are axially applied on the outside of a plastics material plasticizing cylinder, indicated at 4.

More specifically, these assemblies are made starting from strip members, which are clearly illustrated in FIGS. 4 to 8, and which may be adjoined one to another according to the most suitable arrangements.

Figure 4:
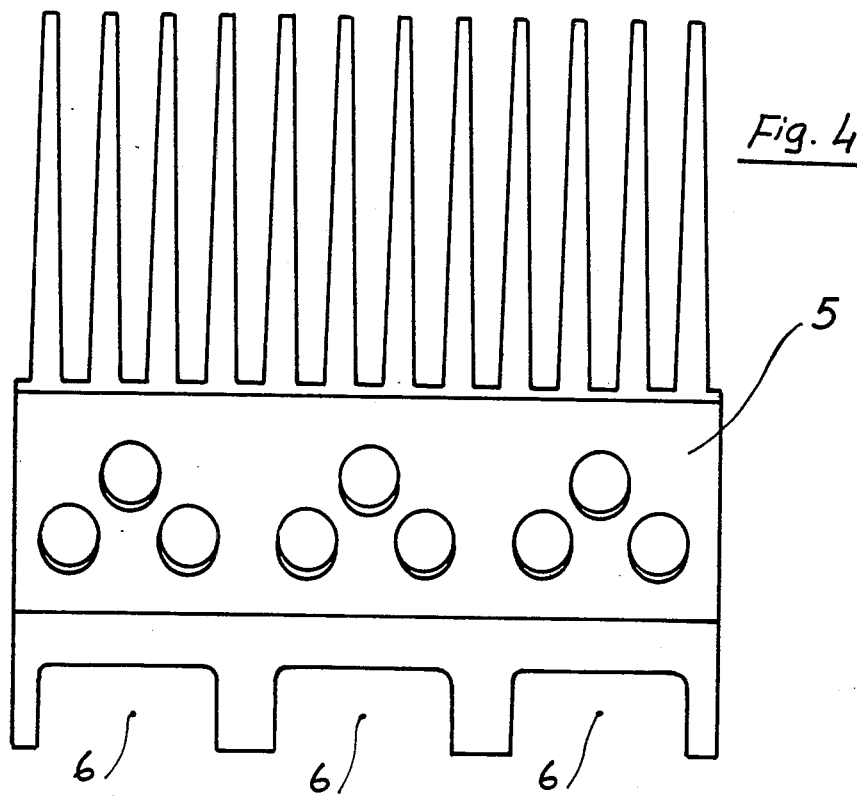
FIGS. 4 and 5 illustrate two different embodiments of the heat exchanger finned assemblies.
Figure 5:
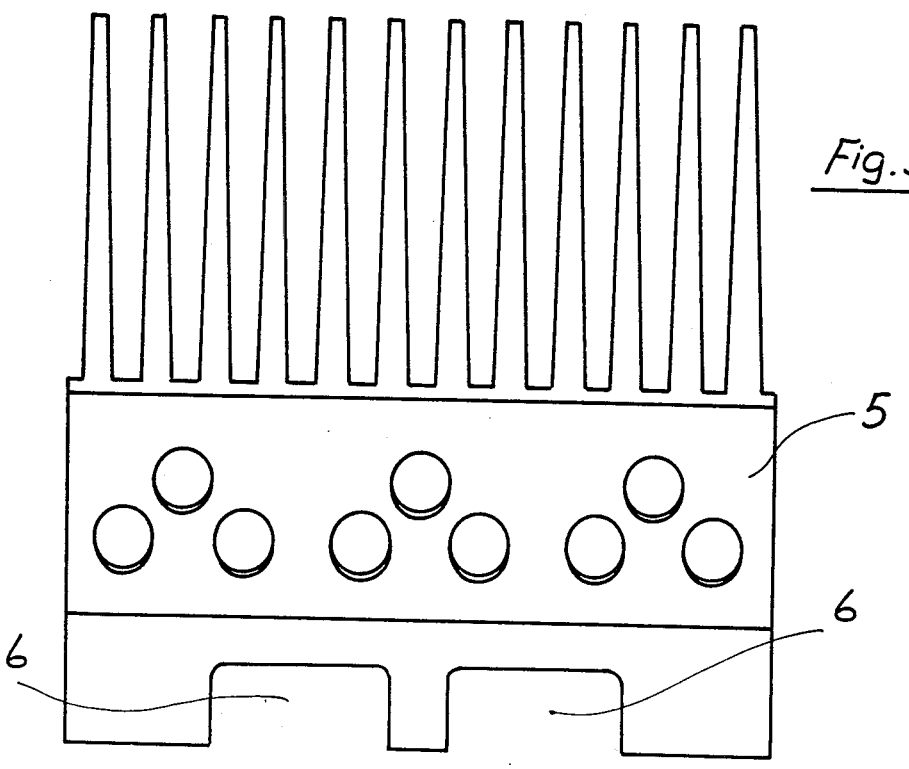
Figure 6:
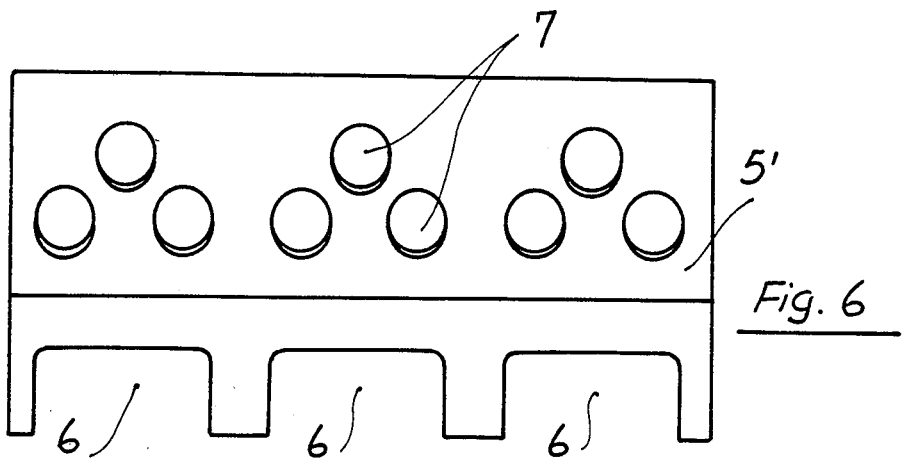
FIGS. 6 and 7 illustrates two different embodiments of strip members, devoid of fins.
Figure 7:
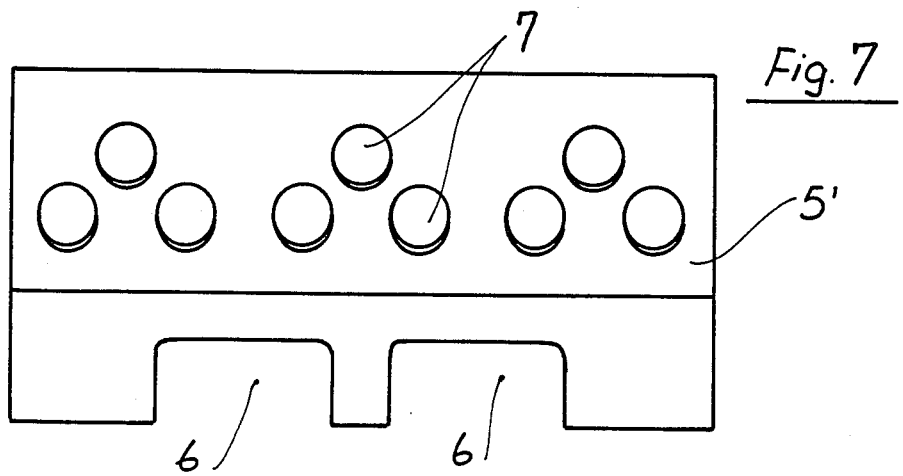

The strip members illustrated in FIGS. 4 and 5 are provided with outer fins and hollows 8 at the end portions thereof contacting the plastics material processing cylinder 4.

The strip members indicated at 5' have a like shape, with the difference that they are not provided with fins.

All of the strip members are formed with throughgoing holes 7 for introducing thereinto electric heating resistances, indicated at 8, and are so constructed as to allow for cooling air to pass therethrough, as it will be illustrated in a more detailed way hereinafter.

Figure 8:
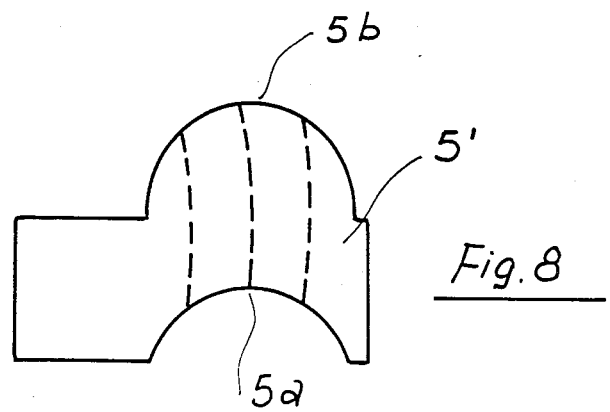
FIG. 8 is a side view illustrating a strip member devoid of fins.

As is clearly shown in the end elevation view of FIG. 8, the strip members are provided, on a side, with a recess 5a, with substantially circular shape, and, on the other side, with a projection 5b, also of substantially circular shape, so as to provide a coupling able of causing the adjoining strip members to assume a nearly circular shape.

Figure 1:
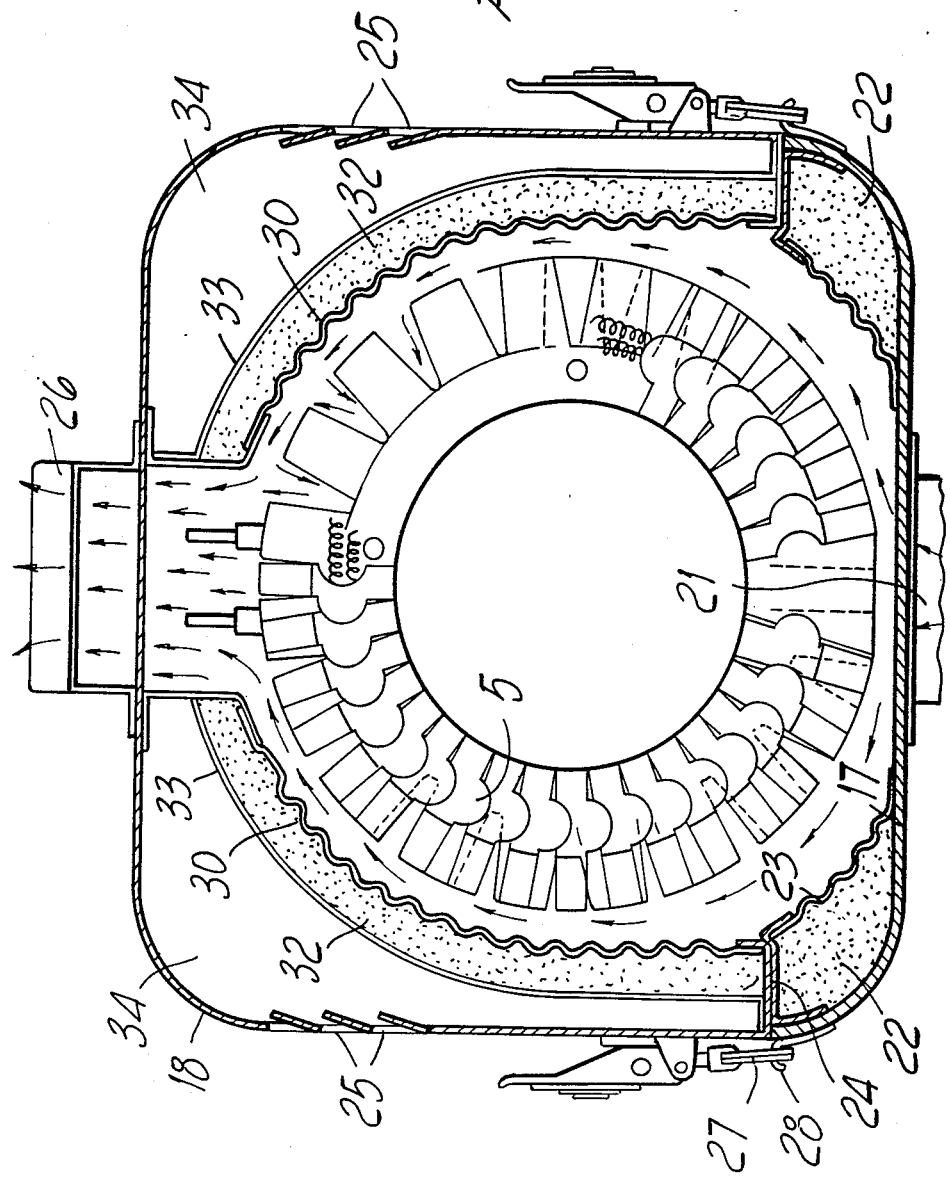
FIG. 1 is a cross-sectional view illustrating the temperature adjusting device according to the invention.
Figure 2:
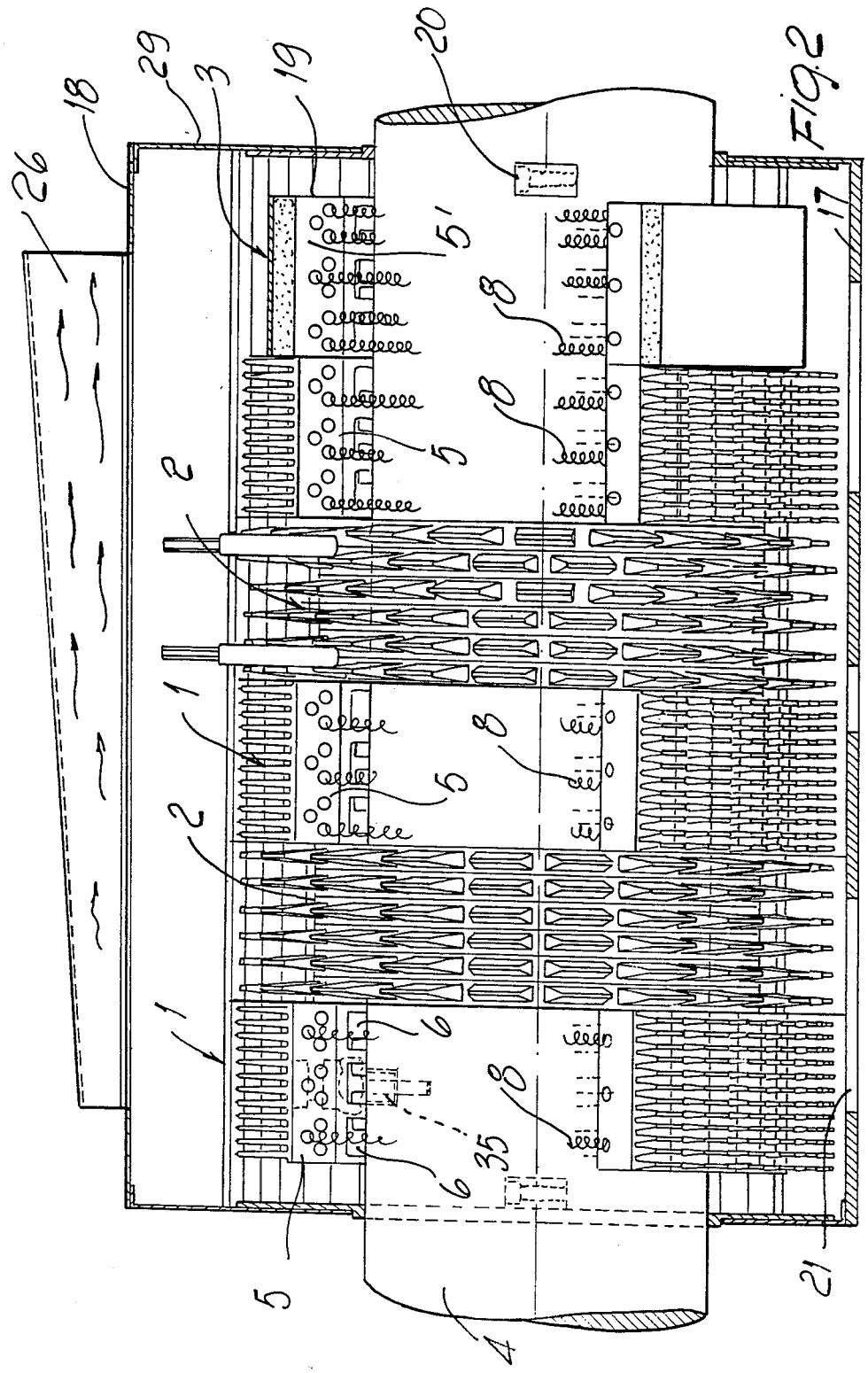
FIG. 2 illustrates a longitudinal cross-sectional view of the temperature adjusting device applied to an extruding machine cylinder.
Figure 3:
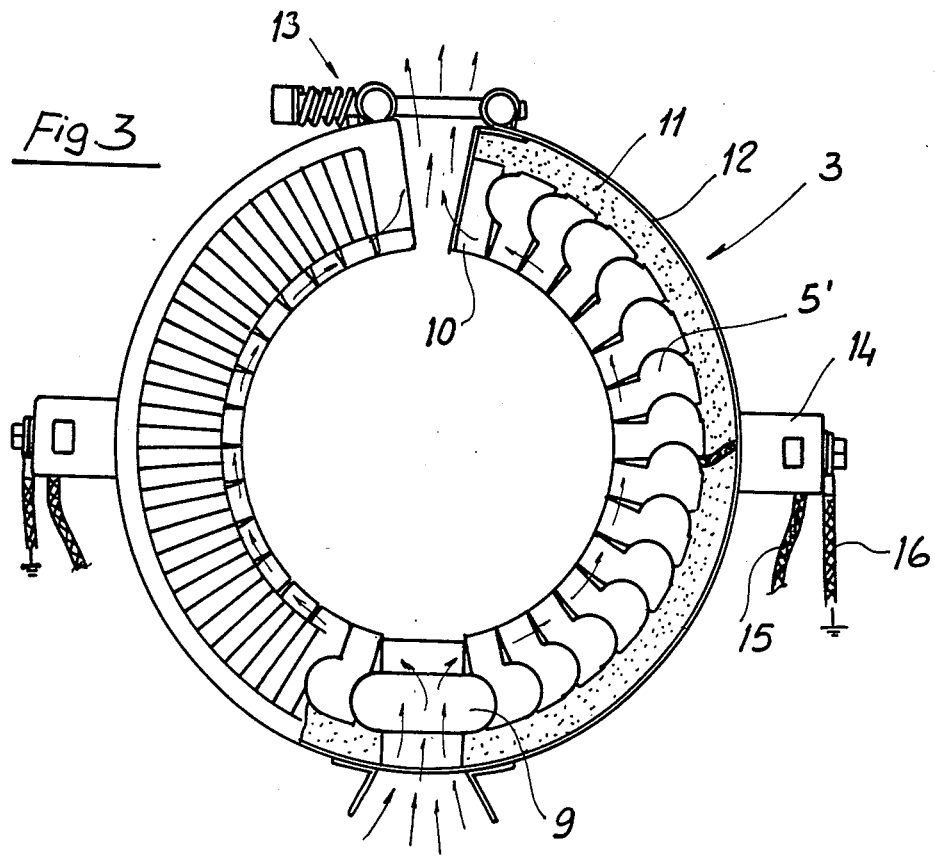
FIG. 3 illustrates a heating electric resistance which forms a part of the flexible body, with air cooling.

The unfinned heating assembly 3, which is specifically shown in FIG. 3, consists of two assemblies, arranged to define a semicylindrical shape, which are separated by a base strip member 9 and a bottom strip member 10, having respective mating shapes.

On the outside they are coated by a thermally insulating material layer 11 which is restrained, jointly to the two semicylindrical assemblies, by an overcoating tight band 12 which is locked by a tierod 30 and supports insulating small blocks 14 thereat end the power supply wires 15 and ground wires 16.

The heating assemblies 1, heat exchanger assemblies 2 and unfinned heating assemblies 3 are protected by a thermally insulated carter, including a fixed portion 17 and a removable portion 18.

The fixed portion consists of a base metal sheet, which is made rigid with the extruding cylinder 4 by means of flanges 19 and supporting small blocks 20.

The base metal sheet is provided with intermediate slots 21, therethrough the forced cooling air is caused to pass, and is provided, at the transversal end portions thereof, upwardly curved, with a thermally insulating material layer 22 which is coated, on a side, by a corrugated metal sheet 23 adapted for operating as a reflecting mirror element and, on the top, by a flat metal sheet 24 providing a resting abutment.

An outer casing, made of stainless steel, is further provided for defining a forced ventilation path, which ventilation path is controlled by an electric motor operating a double fan so as to generate an air flow which is transversely moved of the axial extension of the flexible body and is provided with a discharging outlet which is diametrically arranged of the inlet region.

The removable portion 18 of the carter or casing is advantageously made of a shaped metal sheet having vertically extending walls which are provided with aerating slots 25, and a top horizontally extending wall in which there is formed an air discharging stack 26 for discharging the air conveyed through the outer envelope or casing 40.

The vertical walls are provided with closure hook members 27 engaging with corresponding hook members 28 provided on the fixed portion of the carter or casing and which are intercoupled, at their end portions, by shaped perpendicular walls 29 for closing the carter at the front and rear thereof.

The carter further supports, in its inside and in the longitudinal direction, two corrugated metal sheets 20, which have a substantially semicylindrical arrangement and operate as reflecting mirror elements, and encompass the heating and heat exchanger structure, so as to form, thereabout, continuous gaps 41 for the passage of the cooling air which contributes to the temperature adjusting of the system.

To the mentioned corrugated metal sheets there is coupled a thermally insulating material layer 32 which is enclosed and protected by an outer holding metal sheet 33, which defines, with the carter outer walls, a further gap 34 communicating to the outside through the aerating slots 25.

Thus, a portion of the cooling airflow, by directly entering through the slots 21, contacts the plastics material processing cylinder and passes through the offset hollows 6 of the strip members 5 and 5' so as to adjust to the set value the temperature of said cylinder and prevent the temperature from undesirable increasing.

A portion of the airflow flows through the gaps 31 thereby cooling the outer portion, possibly finned, of the strip members 5 and 5'.

Accordingly, the carter or casing is constantly held at a comparatively low temperature, thereby it does not represent a danger source for the operators.

By acting on the hook members 27, the removable portion 18 of the carter or casing may be easily removed, jointly to the thermally insulating structure coupled thereto, thereby affording the possibility of visually controlling the heat exchanger and heating assemblies.

In order to more accurately control the temperature, inside the carter or casing there is provided at least a thermocouple 35 for controlling the power supplying of the electric resistances 8.

From the above disclosure it should be apparent that the invention fully achieves the intended objects.

While the invention has been disclosed with reference to preferred embodiments thereof, it should be apparent that it is susceptible to several modifications and variations all of which come within the scope of the appended claims.

I claim:

1. A temperature adjusting device, particularly designed for cylinders of plastics material extruding machines, injecting machines, drawing machines for processing plastics material in general, comprising a flexible body adapted to be mounted, as a sleeve member, on the outside of the machine cylinder, a thermally insulated outer casing for housing said flexible body including a plurality of ceramics material strip members of substantially semicircular shape arranged in an adjoining relationship, said strip members being provided with throughgoing holes for housing heating electric resistances, said holes defining forced cooling air passage paths, said thermally insulated outer casing having a fixed portion and a removable portion, said fixed portion consisting of a base metal sheet, made rigid with said machine cylinder by means of flanges and supporting small blocks, said base metal sheet being provided with intermediate slots for allowing for said forced cooling air to pass therethrough, at the transversal end portions of said thermally insulated outer casing there being provided an insulating material layer which is encompassed on a side by a corrugated metal sheet adapted for operating as a reflecting mirror element and, at the top, by a flat metal sheet providing a resting abutment, and two longitudinal semicylindrical corrugated metal sheets, providing reflecting mirror like elements encompassing said strip members and provided with continuous gaps for the passage of said forced cooling air, to said corrugated metal sheets an insulating material layer being applied which is enclosed and protected by a holding outer metal sheet defining, with the outer walls of said outer casing, a gap communicating to the outside through aerating slots.

* * * * *